United States Patent [19]

Spencer et al.

[11] Patent Number: 5,190,651
[45] Date of Patent: Mar. 2, 1993

[54] FILTER CARTRIDGE

[75] Inventors: Terrel F. Spencer; Gary L. Brooks, both of Lake Geneva, Wis.

[73] Assignee: Sta-Rite Industries, Inc., Milwaukee, Wis.

[21] Appl. No.: 720,263

[22] Filed: Jun. 24, 1991

[51] Int. Cl.$^5$ .................................... B01D 27/14
[52] U.S. Cl. .............................. 210/305; 210/315; 210/316; 210/338; 210/342; 210/489
[58] Field of Search ............... 210/305, 314, 315, 316, 210/323.2, 337, 338, 342, 458, 488, 489, DIG. 13

[56] References Cited

U.S. PATENT DOCUMENTS

| | | |
|---|---|---|
| 618,996 | 2/1899 | Riedel et al. |
| 2,888,142 | 5/1959 | Roos ................................. 210/473 |
| 3,223,239 | 12/1965 | Dick ................................. 210/338 |
| 3,390,778 | 7/1968 | Uher ................................. 210/314 |
| 3,408,288 | 10/1968 | Messa ............................... 210/20 |
| 3,988,244 | 10/1976 | Brooks .............................. 210/438 |
| 4,129,429 | 12/1978 | Humbert, Jr. et al. ............. 55/484 |
| 4,138,337 | 2/1979 | Smith ............................... 210/315 |
| 4,172,038 | 10/1979 | Appenzeller et al. ............. 210/332 |
| 4,206,055 | 6/1980 | Hauk et al. ........................ 210/315 |
| 4,319,997 | 3/1982 | Pett ................................... 210/85 |
| 4,498,989 | 2/1985 | Miyakawa et al. ................ 210/450 |
| 4,507,200 | 3/1985 | Meissner ........................... 210/315 |
| 4,668,393 | 5/1987 | Stone ................................. 210/304 |
| 4,692,245 | 9/1987 | Church et al. .................... 210/232 |
| 4,740,299 | 3/1988 | Popoff et al. ..................... 210/232 |
| 4,783,271 | 11/1988 | Silverwater ....................... 210/315 |
| 4,792,397 | 12/1988 | Rasmussen ....................... 210/314 |
| 4,798,670 | 1/1989 | Treene .............................. 210/169 |
| 4,806,243 | 2/1989 | Jackson ............................. 210/303 |
| 4,824,564 | 3/1989 | Edwards ........................... 210/232 |
| 4,909,937 | 3/1990 | Hoffmann et al. ................ 210/315 |
| 5,078,877 | 1/1992 | Cudabeck et al. ................ 210/315 |

Primary Examiner—Robert A. Dawson
Assistant Examiner—W. L. Millard
Attorney, Agent, or Firm—Jansson & Shupe, Ltd.

[57] ABSTRACT

The invention is an improvement in a known cylindrical, annular fluid filter cartridge of the type having a lower end cap supporting spaced, concentric filter elements. The spaced elements define an effluent path therebetween. In known cartridges of the foregoing type, the inner and outer perimeters of the end cap (or either of them) have a significant circumferential "Perimeter of engagement" which seats into a pocket with friction fit. As a result, significant force is required to remove a cartridge, especially a large cartridge, from the housing. The improvement comprises a channel (either a tube-like riser or a manifold) and a discharge port for receiving effluent, e.g., filtered water, from the effluent path. The discharge port (with its relatively small perimeter of engagement) is configured and arranged for attachment to and detachment from an outlet vent located near the bottom of the cartridge housing. Because of the relatively small engagement perimeter of the discharge port (and the resulting reduced "frictional" forces), even large water-soaked cartridges are much more easily removed from the housing as when cleaning or replacing the cartridge.

14 Claims, 11 Drawing Sheets

FILTER CARTRIDGE

FIELD OF THE INVENTION

This invention relates generally to fluid filtration and, more particularly, to fluid filter cartridges.

BACKGROUND OF THE INVENTION

Fluids, e.g., water, oil and the like, are often "conditioned" by passing them through filter cartridges to remove particulate matter. Such cartridges are typically confined within housings into which the fluid is introduced for filtering and later removed. Some installations use multiple filter cartridges within a single housing.

Example of a filter cartridge and housing are shown in U.S. Pat. Nos. 3,988,244 (Brooks) and 4,507,200 (Meissner). Such examples are of particular interest because unlike other filter cartridges mentioned below, the Brooks and Meissner cartridges use dual flow paths. That is, all fluid to be filtered is introduced through a central inlet. A portion of such fluid flows from the center area radially outward through an inner annular filter element. The remainder of the fluid flows to the outer perimeter of the cartridge and from there, radially inward through an outer annular filter element. Both flows join at an annular passage (a space between the filter elements) and pass downward through openings in the annular pocket and thence to a discharge port.

Both the Brooks and Meissner patents show the filter cartridge seated in an annular pocket having a width substantially less than that of the end cap, both dimensions being measured radially. However, the current practice used to "interface" a filter cartridge of the Brooks or Meissner type with the housing is to very snugly seat the end cap in an annular pocket of a width about equal to that of the end cap.

A snug end cap-to-pocket "fit" is used to prevent (or substantially prevent) fluid from "bypassing" the cartridge and flowing through the housing unfiltered. Of course, filtration of essentially all of the fluid passing through the filter housing is highly desirable and the known approach accomplishes that objective—but it is accompanied by a distinct disadvantage.

Such disadvantage arises from the fact that customers using filtration units with swimming pools and other high flow rate applications are demanding increased filtration capacity, i.e., filter element area, consistent with low pressure drop within a given housing. One way to provide such capacity and still maintain a relatively low pressure drop across the cartridges is to incorporate two or more filter cartridges in parallel in a common housing. U.S. Pat. No. 4,909,937 (Hoffmann et al.) shows an example of such an arrangement using concentric filters of varying size. This is a desirable arrangement since, unlike the arrangement of the Pett patent discussed below, it utilizes a relatively high percentage of the space available in the cylindrical housing.

When filters of the Brooks and Meissner type are arranged concentrically and seated in a wide annular pocket as described above, the outer cartridge is quite large if the filtration area of the unit is substantial. Therefore, the end cap-to-pocket fit requires a good deal of force to release the cartridge from the housing as when cleaning or replacing the cartridge. Filter cartridges forcibly dislodged from such pockets (as they must be) may be deformed or otherwise damaged in the process.

And the problem is often aggravated because such cartridge is soaked with fluid and is quite heavy. Lifting a large, sticking, waterlogged filter cartridge vertically upward from its housing can be a trying, rather rigorous chore. As further explained below, such cartridges may weigh 40–50 pounds when wet as compared to only 10–15 pounds when dry.

Examples of other types of filter cartridges and housings are shown and described in U.S. Pat. Nos. 4,319,997 (Pett) and 4,824,564 (Edwards et al.). The arrangement shown in the Pett patent includes a domed generally cylindrical housing having a lower compartmented region into which are threaded multiple filter cartridges. Fluid enters the housing through a central inlet. Filtered fluid passes into the compartment where it joins fluid from other filters and is exhausted through a radially-spaced tube.

The Pett arrangement anticipates fluid leakage around the filter neck and includes what is called a leakage control channel to receive and drain away leaking fluid. Such arrangement suggests that if one wishes to increase the filtration area within the housing, one simply adds additional cartridges, all of which are substantially identical to one another.

The filter shown in the Edwards et al. patent has a lower end cap including nipples extending into apertures in the housing base plate. O-ring seals between the nipples and apertures prevent fluid leakage. The single cartridge is captive in a generally cylindrical housing. Like that of the Pett patent, the Edwards et al. arrangement uses a radially-spaced outlet tube and a central inlet tube.

The housing shown in the Hoffmann et al. patent is domed and generally cylindrical. It appears the filter cartridges are simply positioned atop the connecting adapter which has one or more inlet and outlet tubes, depending upon the embodiment. The concentrically-arranged cartridges are of different diameters and appear to be individually replaceable. When doing so, the connecting adapter appears to be left in place. O-ring seals are provided between the connecting adapter and the housing base but none are apparent between the cartridges and the adapter.

An improved filter cartridge which provides substantially fluid tight sealing with its housing, which nevertheless requires relatively little effort to remove, which can be used in multiple-cartridge installations and which could be used in a "nested" or stacked arrangement would be an important advance in the art.

OBJECTS OF THE INVENTION

It is an object of the invention to provide an improved filter cartridge which overcomes some of the problems and shortcomings of the prior art.

Another object of the invention is to provide an improved filter cartridge which provides a substantially fluid-tight seal with the housing for most complete fluid filtration.

Another object of the invention is to provide an improved filter cartridge which is relatively easy to remove from a housing notwithstanding such fluid-tight seal.

Still another object of the invention is to provide an improved filter cartridge of the dual flow path type.

Yet another object of the invention is to provide an improved filter cartridge useful in a filtration unit having another cartridge of conventional type. How these and other objects are accomplished will become more apparent from the following detailed description taken in conjunction with the drawing.

SUMMARY OF THE INVENTION

The invention is an improvement in a fluid filter cartridge of the type having upper and lower end caps supporting spaced, concentric filter elements which define an effluent path between them. Such cartridges are often cylindrical in shape and annular. That is, they have a hollow central region adjacent the inner element. Fluid is filtered by flowing from the central region radially outward through the inner element and from the cartridge perimeter radially inward through the outer element. Such filtered fluid then enters the effluent path between the elements and flows by gravity to regularly spaced, somewhat kidney-shaped exit passages formed in the lower end cap and aligned with the effluent path. An example of such a filter cartridge is shown in U.S. Pat. No. 3,988,244 (Brooks).

In known filter cartridges of the cylindrical type, the lower cartridge end cap is often "seated" in an annular pocket formed in the filter housing. When so arranged, the circular outer and inner perimeters of the end cap are snugly fitted to the outer and inner edges of the pocket to prevent fluid leakage past the cartridge.

The total circumference of such perimeters is quite large and the resulting "fit" between end cap and housing may be said to be "high friction." As a result of such tight fit and large aggregate "perimeter of engagement," significant effort is required to free the cartridge. That is, a good deal of lifting force is required to separate the cartridge end cap from the housing when lifting the cartridge out of the housing.

The improvement comprises a fluid exhaust channel integral to the cartridge and a tube-like discharge port for connection to an outlet vent in the filter cartridge housing. Effluent entering the channel flows through the discharge port and the outlet vent and thence from the housing. When the improved cartridge is used in connection with swimming pools, the filtered clean effluent is returned to the pool.

The discharge port has a relatively small perimeter of engagement with a discharge vent and is thereby configured and arranged for low-friction attachment to and detachment from such vent. Therefore, even a large, waterlogged filter cartridge may be readily removed from the filter housing.

In the improved filter cartridge, the ability to readily detach the cartridge from the housing by reduced lifting force is because the total perimeter of engagement between the discharge port and the outlet vent is substantially less, usually several times less, than the perimeter of engagement between the inner and outer edges of the end cap with the housing in known arrangements. The force required to seat the improved cartridge in its housing is also materially reduced from that required when using known cartridges. However, installation of a cartridge (as opposed to its removal) is usually less of a problem in any event since in conventional housing-cartridge orientations, gravity aids rather than resists installation. And the cartridge being installed is often a new, dry cartridge and therefore weighs much less than the one removed.

In a variation of one embodiment, the cartridge includes an end cap with exit openings therein and the channel includes a manifold having a conduit in flow communication with such exit openings whereby effluent from such openings may flow to such discharge port.

Another variation of such embodiment is particularly useful with larger filter elements, especially those of a type where such elements are separated by a spacer or core such as shown in the aforementioned Brooks patent. Such variation includes an annular divider supporting the core (which often has significant weight in larger filters) and dividing the interior of the manifold to two concentric, substantially unobstructed flow conduits.

Either variation may be formed by bonding a separate manifold section to the outer surface of the lower end cap or by molding the manifold and the end cap as a single unit. However, in a highly preferred embodiment, the end cap is molded with a pair of generally circular, spaced rims extending downward therefrom. A plate-like closure member is attached to such rims to form the manifold. Attachment is preferably by casting the closure member to the rims as described below in the detailed description. In any embodiment, the manifold is integral to the end cap in the completed filter cartridge.

In another variation of such embodiment, the manifold further includes one or more ribs extending from it to support the cartridge within the filter housing. Such rib(s) also help "pilot" the cartridge as it is being seated in the housing. In a highly preferred embodiment, the improved filter cartridge also includes a lifting handle, thereby aiding the removal of such cartridge from its housing. When the cartridge is used in a housing arranged as described below, the lifting handle preferably includes an outwardly extending lip on the upper end cap.

In another embodiment, the channel includes a tube-like riser in fluid communication between the effluent path and the discharge port whereby such cartridge is self-venting. As the filter cartridge and, particularly, the effluent path fill with fluid, the riser permits air to escape from such path and be exhausted out the discharge port. Of course, after the cartridge fills with fluid, the riser carries fluid from the path to the vent—and the discharge port still provides low friction attachment to and detachment from the vent.

The improved filter cartridge may be used in a housing that is "quasi-spherical" in shape. That is, such housing has a circular cross-section in one plane and a somewhat egg-shaped or elliptical cross-section in another plane normal to the first. Such shape is selected in view of several factors.

One is that spherical pressure vessels (like filter housings) have "hoop stresses" which are lower than those of vessels of other shapes for equivalent internal pressures. Therefore, for a given anticipated pressure, the walls of the housing can be thinner than walls of such vessels of other shapes. In other words, it takes less material to fabricate such walls and this reduces manufacturing costs.

Another factor is that the ratio of exterior surface area to interior volumetric space is minimized for spherical vessels. That is, the designer obtains more usable interior space for a given vessel surface area and this, too, helps reduce the cost of the vessel since less material is required to make it.

Yet another factor is that, unlike filter cartridges of cylindrical shape, spherical filter cartridges are difficult and somewhat impractical to make. The quasi-spherical shape of a preferred housing permits use of cylindrical cartridges while yet maximizing the amount of available interior housing space occupied by filtering media.

Such space utilization is by using plural cylindrical filter cartridges within the housing. Such cartridges may be concentric, "nested" one within the other and have differing heights. The inner cartridge (that having the smaller diameter) has a height different from, and preferably greater than, the height of the outer cartridge. And the arrangement is not limited to the use of two cartridges. Three or more cartridges may be used, each having a height less than the height of the inwardly adjacent cartridge. As will become more apparent from the detailed description, the "envelope" defined by the plural nested cartridges is quasispherical in shape for improved interior space utilization.

Filter elements used in filter cartridges are often made of pleated cloth or paper. While such elements do an excellent job of removing particulate matter from the fluid, they are readily damaged. And for best filter efficiency, it is preferred that fluid pass through such elements across the entirety of the element area rather than merely at a concentrated locale. Accordingly, a preferred housing for the cartridge includes an inlet baffle for deflecting inflow, i.e., fluid flowing into such housing.

The baffle prevents such pressurized fluid—which often enters the housing through an inlet port normal to and closely adjacent a filter element—from directly impinging on such element, thereby preventing damage to such element. The baffle directs such fluid along paths parallel to the outer surface of the filter element so that the fluid can enter the element substantially across the entirety of its area.

One preferred housing also includes a valve for draining fluid from such housing. The housing is (or should be) drained and cleaned when filter cartridges are cleaned or replaced and when the equipment is being stored for winter. The valve includes a coupler for attaching a garden hose since the user may wish to drain fluid to a remote site.

The foregoing briefly describes an improved filter cartridge and how plural cartridges (perhaps only one or less than all of which include a channel and discharge port) are used in a quasi-spherical housing. However, the improved cartridge is not so limited in its use. More specifically, the improved cartridge may be used in housings of other configurations and in a way to maximize the amount of interior housing space used for filtration.

For example, the improved filter cartridge may be used in cylindrical housings, either singly or in plural stacked cartridge arrangements. In the latter, two improved cartridges may be used. The lower cartridge (seated on and attached to the housing) includes a channel and discharge port integral to the cartridge. The discharge port of the lower cartridge is attached to the housing outlet vent while that of the upwardly adjacent cartridge is attached to the lower cartridge.

Such upper cartridge also includes an integral channel and discharge port for attachment to the lower cartridge. For arrangements involving three or more stacked cartridges, each such cartridge except the uppermost has a channel and a port at each end. In the interest of uniformity of production, all such cartridges may have a channel and port at each end and the upper port of the uppermost cartridge is capped. It is to be appreciated that a particular port may function as a discharge port or as an intake port, depending upon the orientation of the cartridge. In the stacked cartridge arrangement described above, all cartridges are generally cylindrical in shape and preferably have the same outside diameter.

As used herein, "inflow" means contaminated fluid flowing into the housing to be filtered. "Effluent" means fluid which has been filtered and is to flow out of the housing, usually to be returned to the site of use, e.g., a swimming pool.

DETAILED DESCRIPTION OF PREFERRED EMBODIMENTS

Figure 12:
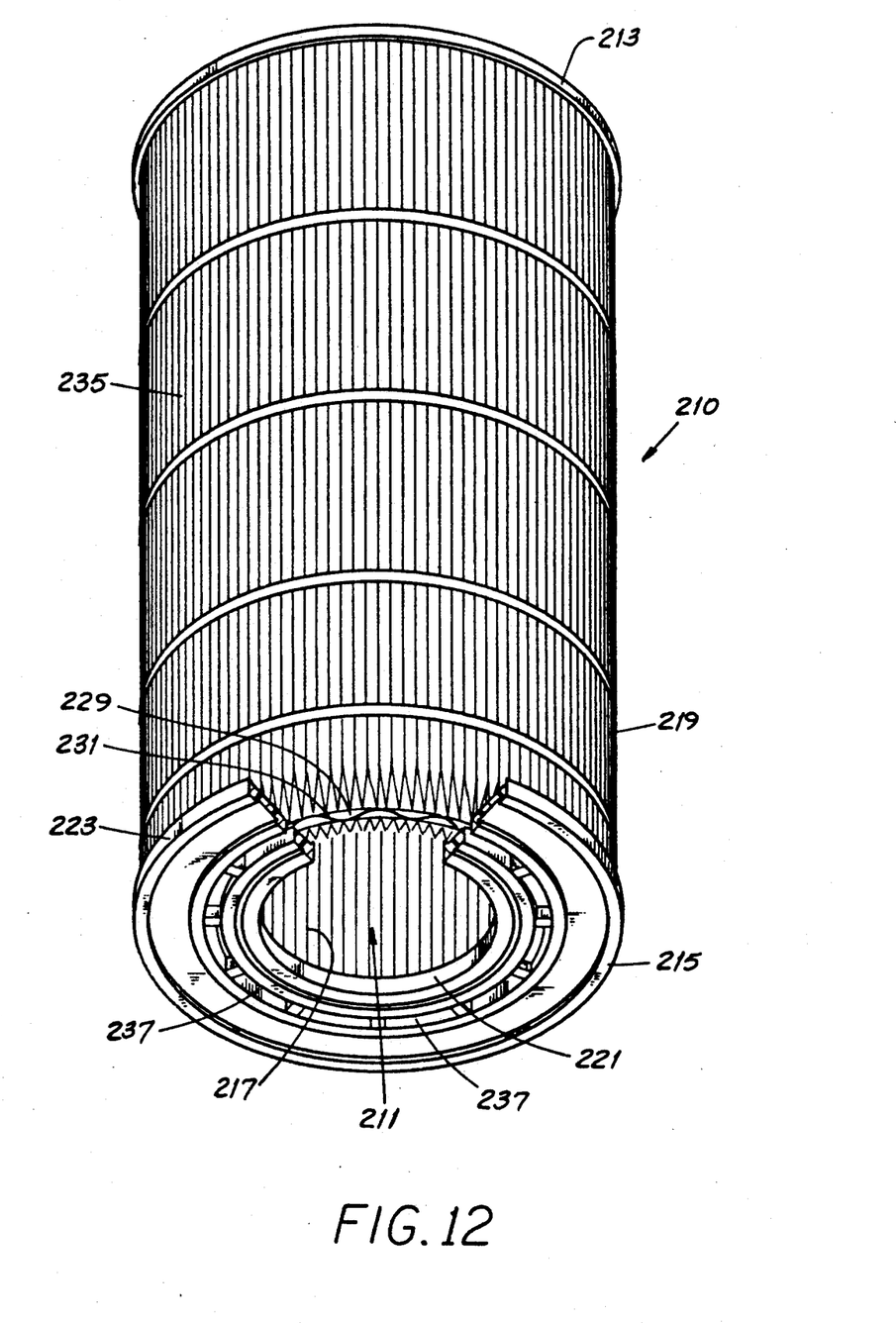
FIG. 12 is an elevation perspective view, with parts broken away, of a prior art filter cartridge.
Figure 13:
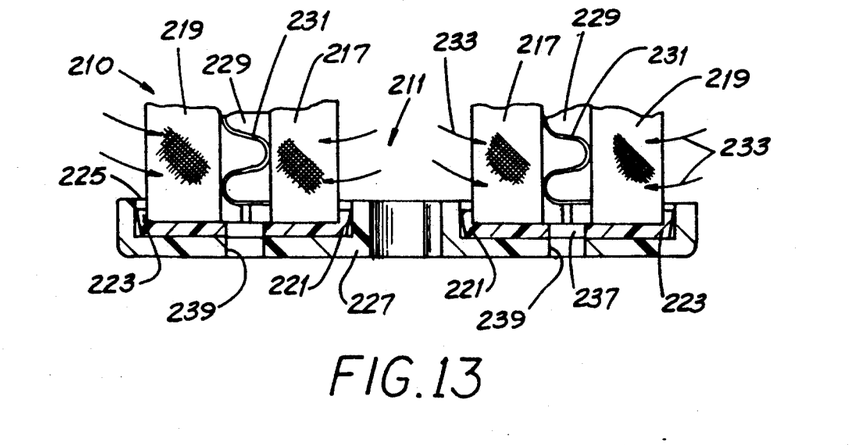
FIG. 13 is an elevation view, in cross section and with parts broken away, of a portion of a prior art cartridge and housing showing a known way of seating the cartridge of FIG. 12 in such housing.

The invention is an improvement of a known type of filter cartridge 210 shown in FIGS. 12 and 13. An understanding of the invention—and of the significant benefits provided by it—will be aided by first appreciating some of the features of such known cartridge 210.

Such cartridge 210 has a hollow central region 211 and includes an upper end cap 213 and a lower end cap 215, both of which are attached to and support an inner filter element 217 and an outer filter element 219. The inner and outer perimeters 221, 223 of the end cap 215 are flared somewhat to provide a relatively tight, substantially leakproof fit with an annular pocket 225 in the housing 227 as described below.

The filter elements 217, 219 are spaced from one another and define an annular, cylindrically-shaped effluent path 229 between them. If made of a rigid, relatively strong material, such filter elements 217, 219 may need no further support. On the other hand, if such filter elements 217, 219 are made of pleated paper or cloth (common configurations), such elements 217, 219 are often supported by a spacer or core 231 placed in the path 229. Such core 231 is configured (with holes, grooves or the like) to permit fluid to freely flow in the path 229 notwithstanding the presence of the core 231. As represented by arrows 233, fluid is filtered by flowing from the central region 211 radially outward through the inner element 217 and from the cartridge perimeter 235 radially inward through the outer element 219. Filtered fluid then flows along the path 229 to and through the exit passages 237 described below.

At least the lower end cap 215 has a plurality of spaced, somewhat kidney-shaped exit passages 237, each of which is in flow communication with the path 229. As shown in FIG. 13, fluid from the exit passages 237 is directed to passages 239 in the housing 227 as more particularly shown in the aforementioned Brooks patent. It should be understood that in certain embodiments of the invention, end caps which are devoid of such exit passages 237 are used.

When the lower end cap 215 is "seated" in the annular pocket 225 the circular outer and inner perimeters 223, 221, respectively, of the end cap 215 are fitted to the outer and inner walls of the pocket 225 in what may be described as a slight "press fit." The total circumference of such perimeters is quite large. The resulting engagement between end cap 215 and housing 227 may be said to be "high friction" and a good deal of lifting force is required to free the cartridge 210 when removing it from the housing 227 for cleaning or replacement. And, of course, larger cartridges require more effort to free them than do smaller cartridges. When the cartridge 210 is water-soaked, the required effort is further increased.

The invention is responsive to the objectives of complete fluid filtration and easy filter cartridge removal and will now be explained in detail.

Figure 1:
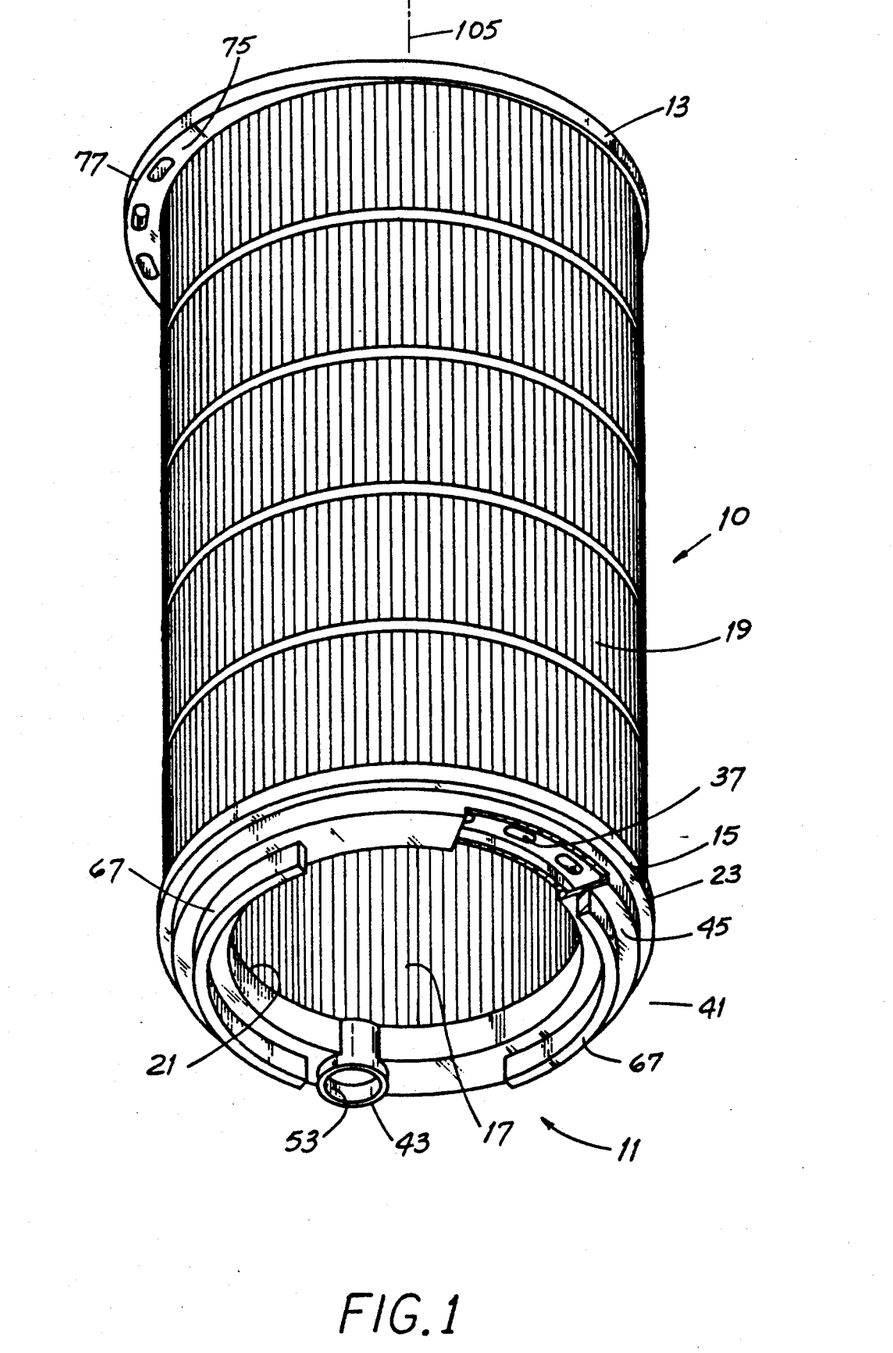
FIG. 1 is an elevation perspective view of a highly preferred version of the improved filter cartridge with part broken away and other parts shown in cross-section.
Figure 2:
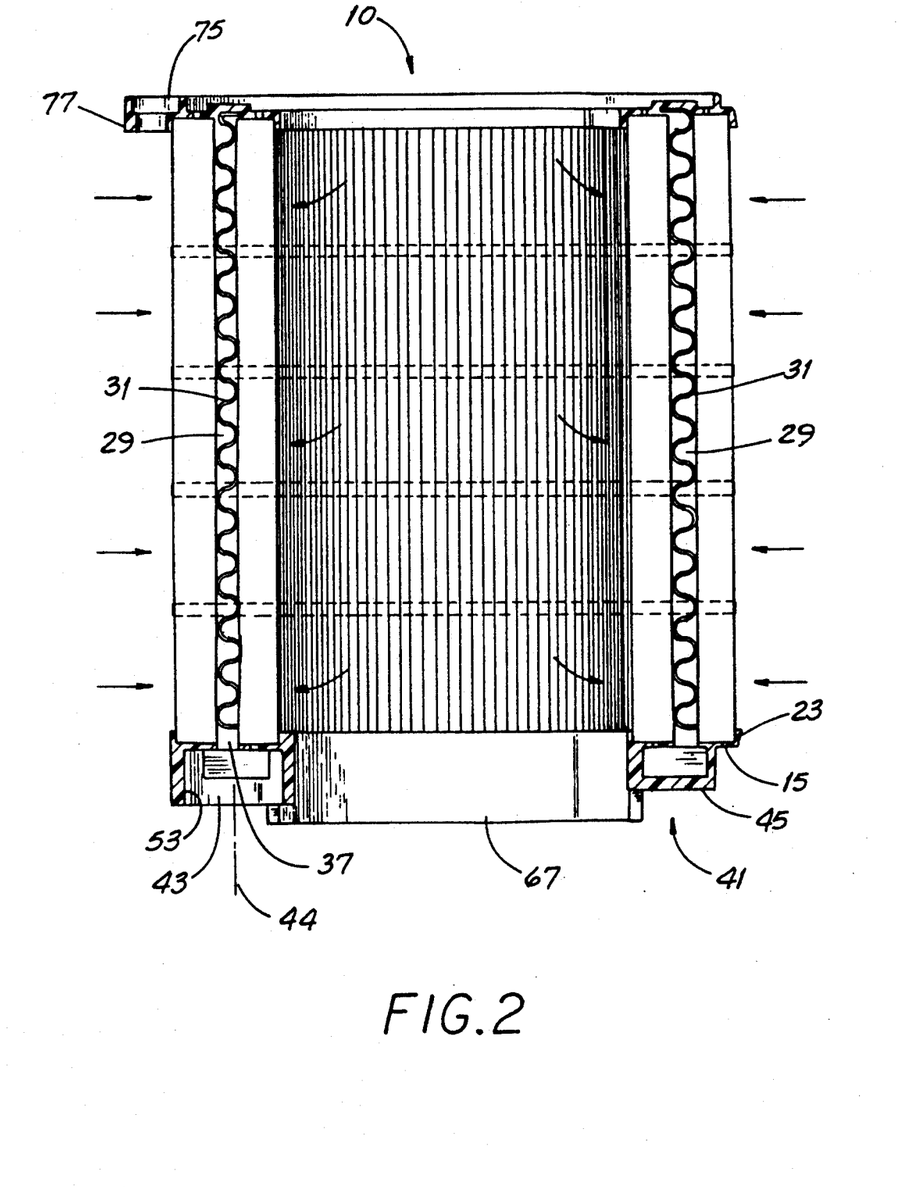
FIG. 2 is a cross-sectional elevation view of the cartridge of FIG. 1 taken generally along a viewing plane which includes the central longitudinal axis of the cartridge and the longitudinal centerline of the discharge port.
Figure 3:
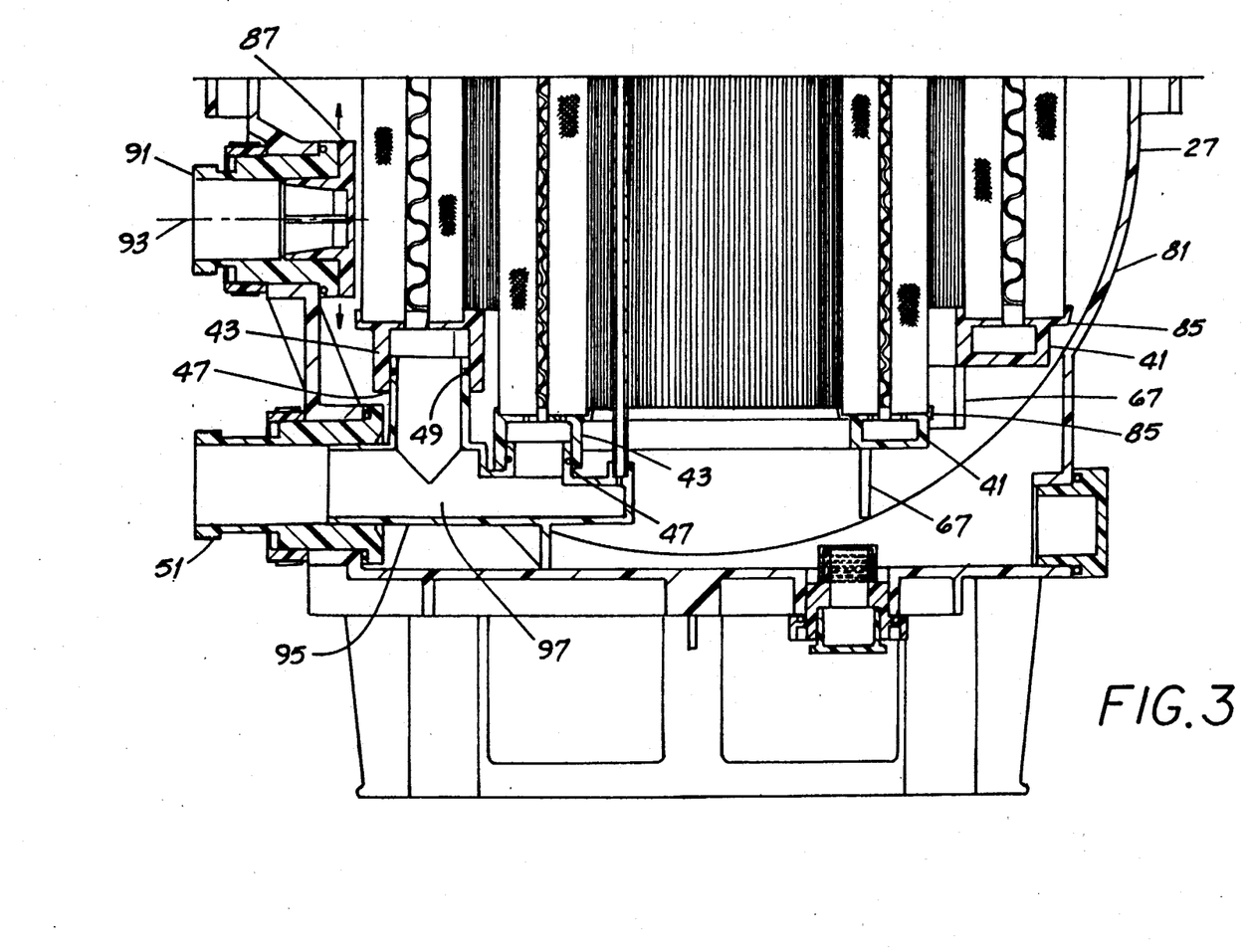
FIG. 3, taken together with FIG. 8, is a cross-sectional elevation view of a quasi-spherical filter cartridge housing with filter cartridges contained therein.

Referring to FIGS. 1 and 2, the improved filter cartridge 10 includes a channel 41 and discharge port 43 integral to the cartridge 10. In one embodiment, such channel 41 includes an annular, hollow manifold 45 integral to the lower end cap 15. Fluid flowing down the effluent path 29 and out the exit passages 37 flows along and around the ring-like conduit defined by the manifold 45 and is exhausted through the tube-like discharge port 43. As shown in FIG. 3, such port 43 has a longitudinal centerline 44 and is connected to a vent 47 in the filter cartridge housing 27. The port 43 and vent 47 are preferably circular in cross-section and cooperatively sized so that the vent 47 is telescopically received within the port 43 with snug, sliding fit. An O-ring seal 49 helps prevent leakage between the port 43 and the vent 47.

Effluent entering the manifold 45 flows through the discharge port 43 and the vent 47 and thence from the housing 27 through the outlet port 51. When the improved cartridge 10 is used in connection with swimming pools, the filtered clean effluent is thereupon returned to the pool.

It is to be particularly appreciated that the discharge port 43 is configured and arranged with a perimeter of engagement 53 along its internal circumference which is substantially less than the perimeter of engagement of the outer and inner perimeters 223, 221 with the pocket 225 as shown in FIGS. 12 and 13. To put it another way, the internal circumference of the port 43 is much smaller than the total of the circumferences of the inner and outer perimeters 221, 223 or of either of them alone.

Of course, the cross-sectional area of the port 43 will also be much less than the area circumscribed by either the inner perimeter 221 or outer perimeter 223 of the end cap 215. As a result, the port 43 provides low-friction attachment to and detachment from the discharge vent 47. Therefore, even a large, waterlogged filter cartridge 10 may be much more easily removed from the filter housing 27.

While the port 43, vent 47 and cartridge 10 are depicted in the drawing as having circular cross-sections, they are not so limited. For example, they could be square, rectangular or of some other shape. Notwithstanding, the cross-sectional area of the port 43 (and its corresponding vent 47) is well less than the area circumscribed by either the inner perimeter 21 or outer perimeter 23 of the end cap 15.

The force required to install the improved cartridge 10 in its housing 27 is also materially reduced from that required when using known cartridges 210. However, installation of a cartridge 10 is less of a problem in any event since gravity aids, rather than resists, installation. And the cartridge 10 being installed is often a new, dry cartridge and therefore much lighter than the one being removed.

Figure 4:
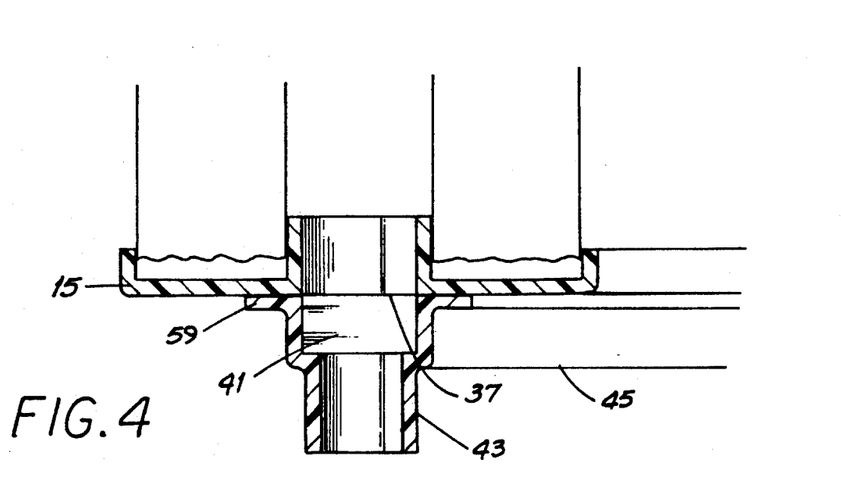
FIG. 4 is a simplified cross-sectional elevation view of a variation of a portion of the improved cartridge.
Figure 5:
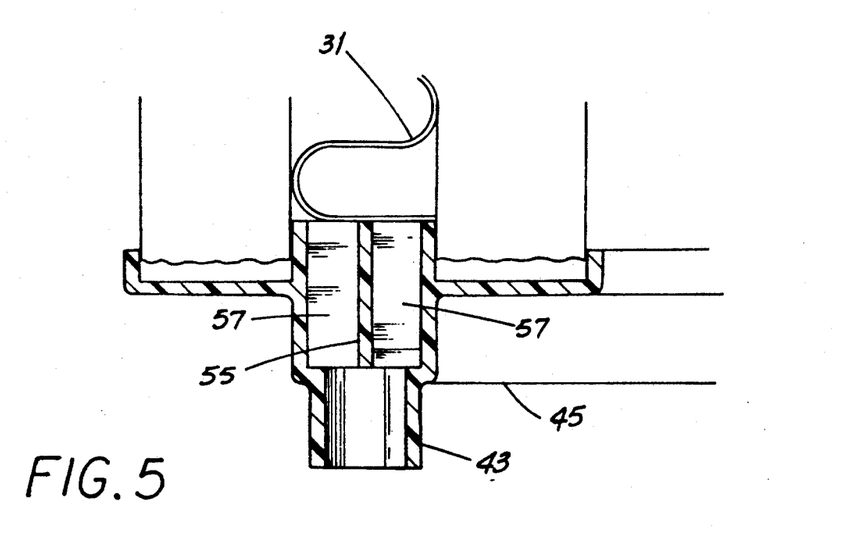
FIG. 5 is a simplified cross-sectional elevation view of another variation of the cartridge portion shown in FIG. 4.

Referring additionally to FIG. 4, a variation of the manifold 45 includes a single channel 41 in flow communication with the exit passages 37 whereby effluent from such exit passages 37 may flow to the discharge port 13. Another variation shown in FIG. 5 is particularly useful with larger filter elements 17, 19, especially those of a type where such elements are separated by a core 31 such as shown in the aforementioned Brooks patent. Such variation includes an annular divider 55 supporting the core 31 (which often has significant weight in larger filters) and dividing the interior of the manifold 45 to two concentric, substantially unobstructed flow conduits 57.

Either variation may be formed by bonding a separate manifold section 59 to the outer surface of the lower end cap 15 as shown in FIG. 4. Or the variation may be formed by molding the manifold 45 and the end cap 15 as a single unit as shown in FIG. 5.

Figure 6:
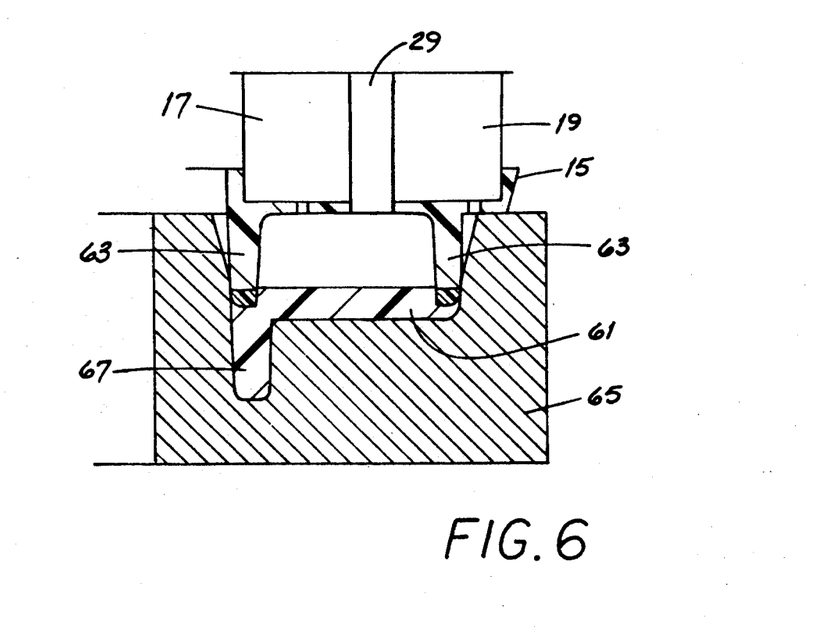
FIG. 6 is a simplified cross-sectional elevation view of a cartridge channel of the type including a manifold.

However, in a highly preferred embodiment shown in FIG. 6, the end cap 15 is first "cast" by mixing the two constituents of a polyurethane resin and dispensing such mixture into a shape-defining mold. Such resin is preferably a rapid set polymer (RSP), the hardening time (about 1–10 minutes) of which can be controlled within that range. While the resin is still liquid, the pleated filter elements 17, 19 are seated into it and the resin "wicks" upward along the ends of such elements.

After the resin hardens, the end cap 15 and the elements 17, 19 are permanently bonded.

The plate-like closure member 61 is then similarly cast to the rims 63 of the end cap 15 to complete the manifold 45. To do so, the end cap 15 is placed in another shape-defining mold 65 and resin mixture dispensed into the mold 65 to form the member including the ribs 67 described below. In such arrangements, the manifold 45 is integral to the end cap 15 in the completed filter cartridge 10.

In a highly preferred embodiment, the manifold 45 also includes one or more ribs 67 extending from it to support the cartridge 10 within the filter housing 27. Such rib(s) 67—shown in FIGS. 1, 2, 3, and 6—also help "pilot" the cartridge 10 as it is being seated in the housing 27.

Figure 7:
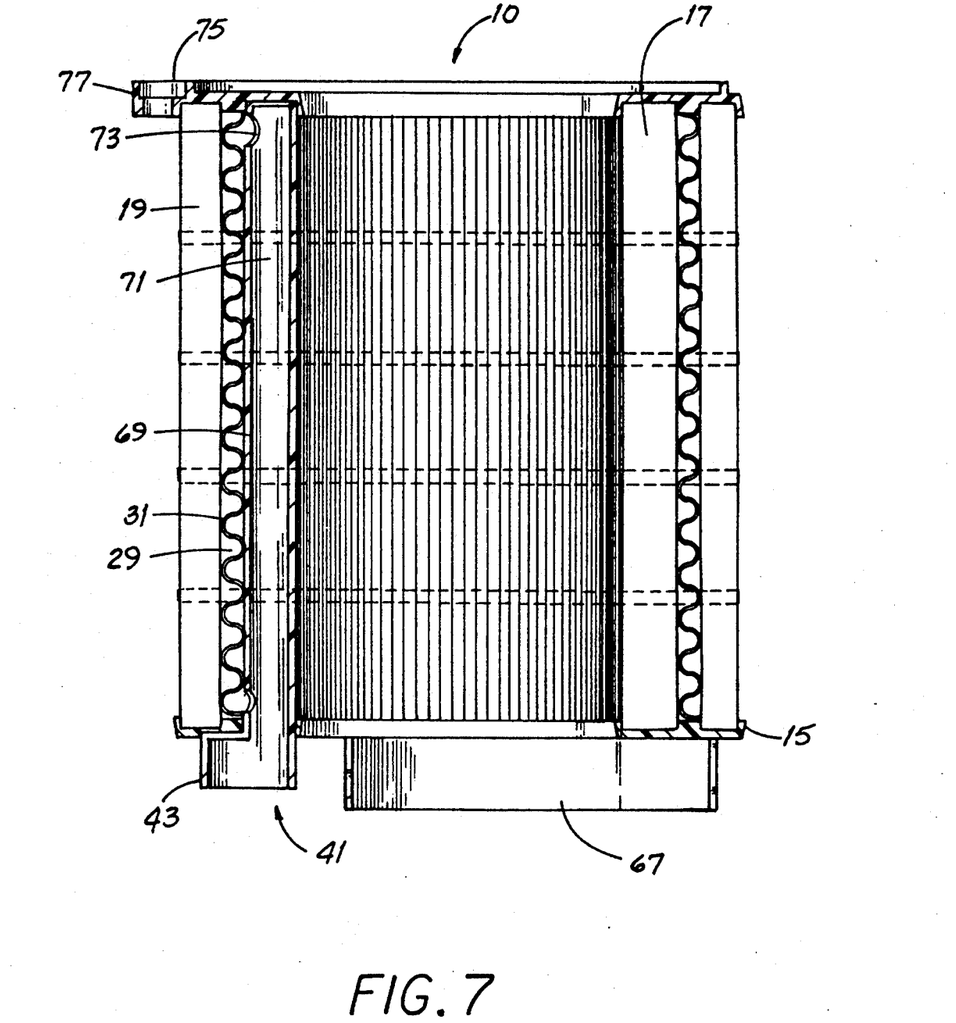
FIG. 7 is a cross-sectional elevation view of another preferred embodiment of the improved cartridge taken generally along a viewing plane which includes the central longitudinal axis of the cartridge and the longitudinal centerline of the discharge port.

In another embodiment shown in FIG. 7, the channel 41 includes a hollow, tube-like riser 69 integral to the cartridge 10. Such riser 69 has a discharge port 43 (preferably circular in cross-section) and an upper portion 71 extending along the effluent path 29 and positioned between such path 29 and the inner filter element 17. The upper end of such upper portion 71 terminates in an opening or "notch" 73 in fluid communication between the path 29 and the interior of the riser 69.

During initial fluid-filtering, the level of fluid rises in the path 29. Air, otherwise trapped in the cartridge 10, is expelled by the rising fluid and flows through the notch 73, down the riser 69 and out the discharge port 43. The cartridge 10 is thereby self-venting. Of course, when the rising fluid reaches the level of the notch 73, it, too, flows out the discharge port 43 in the same way. It is to be appreciated that in this embodiment, exit passages 37 in the end cap 15 are not required since all of the filtered fluid flows down the riser 69 and out the port 43.

Referring to FIGS. 1, 2, 3 and 7, a preferred filter cartridge 10 also includes a lifting handle 75, thereby aiding the removal of such cartridge 10 from its housing 27. When the cartridge 10 is used in a housing 27 arranged as described below, the lifting handle preferably includes a radially outwardly extending lip 77 along only a portion of the upper end cap 13.

Figure 8:
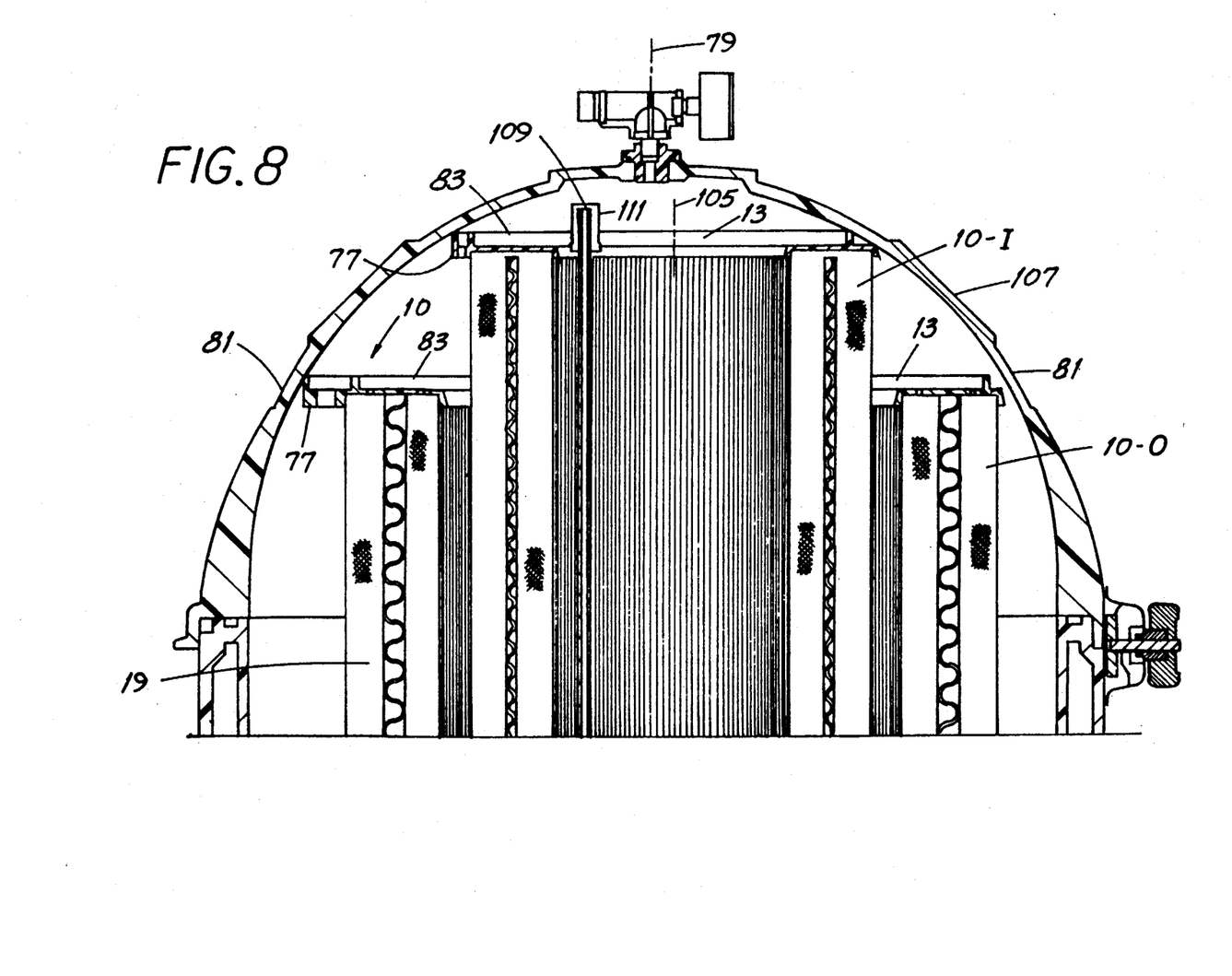
FIG. 8, taken together with FIG. 3, is a cross-sectional elevation view of a first embodiment of a quasi-spherical filter cartridge housing with two improved filter cartridges contained therein.

Referring next to FIGS. 3 and 8, the improved filter cartridge 10 may be used in a housing 27 that is "quasi-spherical" in shape. That is, such housing 27 has a circular cross-section in a plane normal to the housing central vertical axis 79 and a somewhat egg-shaped or elliptical cross-section in a plane which includes such axis 79. Such shape is selected in view of several factors.

One is that for equivalent internal pressures, spherical or nearly-spherical pressure vessels (like filter housing 27) have "hoop stresses" lower than those of vessels of other shapes. Therefore, for a given anticipated pressure, the walls 81 of the housing 27 can be thinner than walls of vessels of other shapes. In other words, it takes less material to fabricate such walls 81 and this reduces several costs including manufacturing and shipping costs.

Another factor is that the ratio of interior volumetric space to exterior surface area is maximized for spherical vessels. That is, for a spherical or quasi-spherical vessel, there is more usable interior space for a given vessel surface area. This, too, helps reduce the cost of the vessel since less material is required to make it. As used herein, the term "quasi-spherical" means spherical or nearly spherical.

Yet another factor is that, unlike filter cartridges of cylindrical shape, spherical filter cartridges are difficult and somewhat impractical to make. The use of spherical and quasi-spherical shapes for a "family" of preferred housings 27 permits use of a family of standardized cylindrical cartridges 10 while yet maximizing the amount of available interior housing space occupied by filtering media.

Such space utilization is by using plural cylindrical filter cartridges 10 within the housing 27. In a highly preferred embodiment as shown in FIGS. 3 and 8, such cartridges 10 are concentric one to another, "nested" one within the other and have differing heights. The inner cartridge (that having the smaller outside diameter and identified as 10-I) has a height different from, and preferable greater than, the height of the outer cartridge identified as 10-O. And the arrangement is not limited to the use of two cartridges 10. Three or more cartridges 10 may be used, each having a height less than the height of the inwardly adjacent cartridge 10.

In the arrangement shown in FIGS. 3 and 8, each cartridge 10 within the housing 27 includes a channel 41 and discharge port 43. Each such discharge port 43 connects to its own vent 47 and thence to the outlet port 51. Such arrangement is highly preferred, especially when the cartridges 10 are of such a size that, if constructed conventionally, even the smallest cartridge 10 would be difficult to free from the housing 27.

Figure 9:
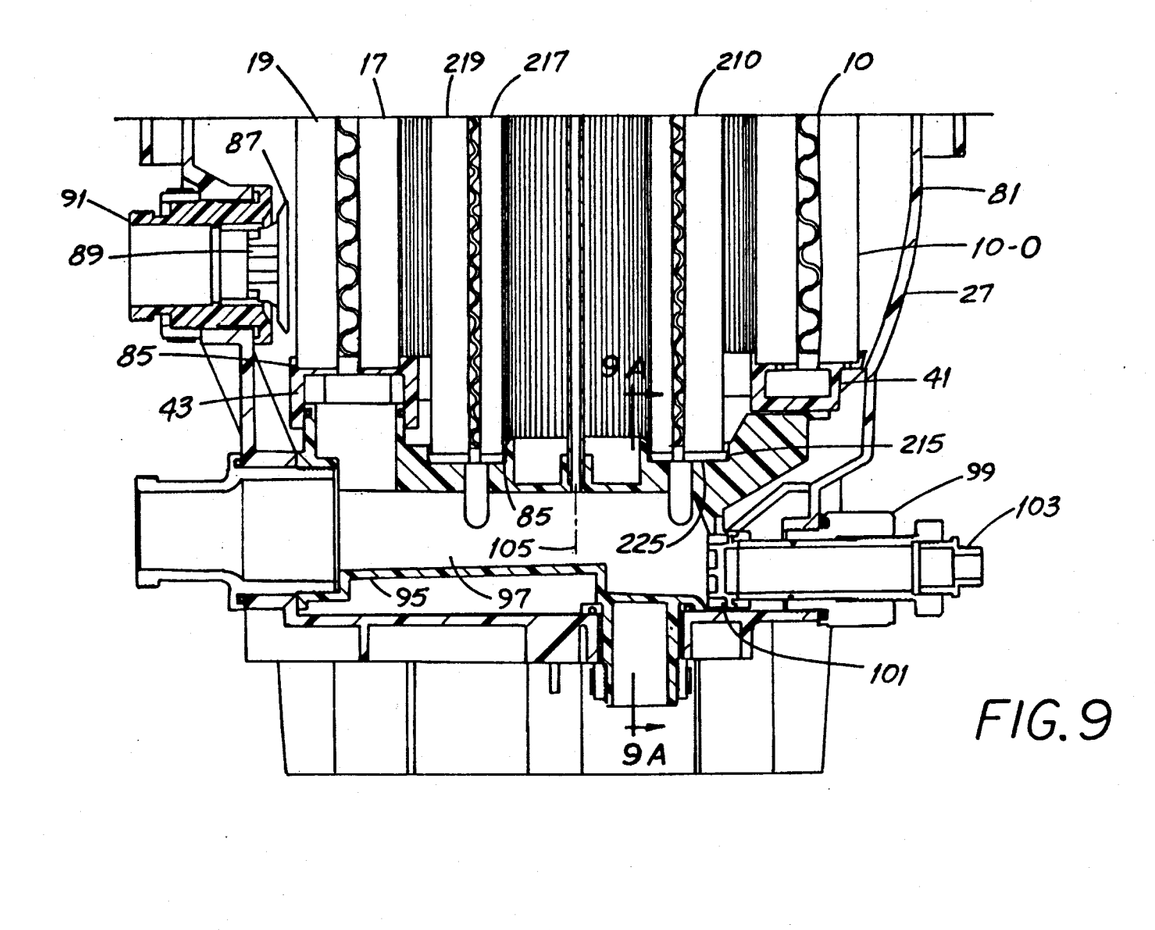
FIG. 9, taken together with FIG. 10, is a cross-sectional view of a second embodiment of a quasi-spherical filter cartridge housing with one improved filter cartridge and one conventional cartridge contained therein.
Figure 9A:
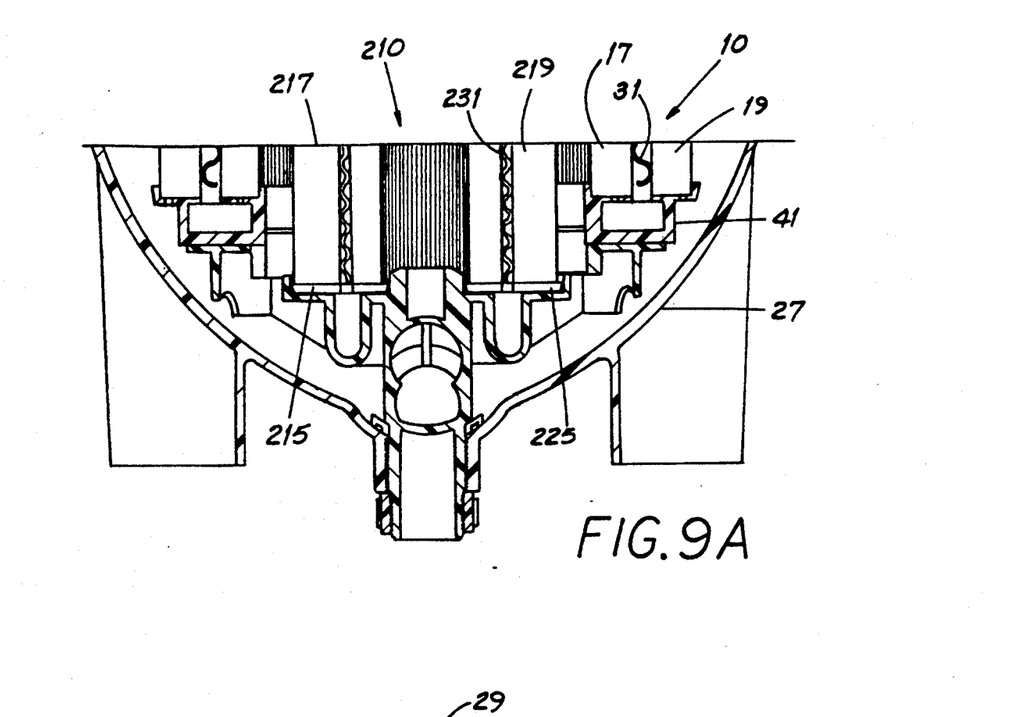
FIG. 9A is a cross-sectional elevation view taken generally along the viewing plane 9A—9A of FIG. 9.
Figure 10:
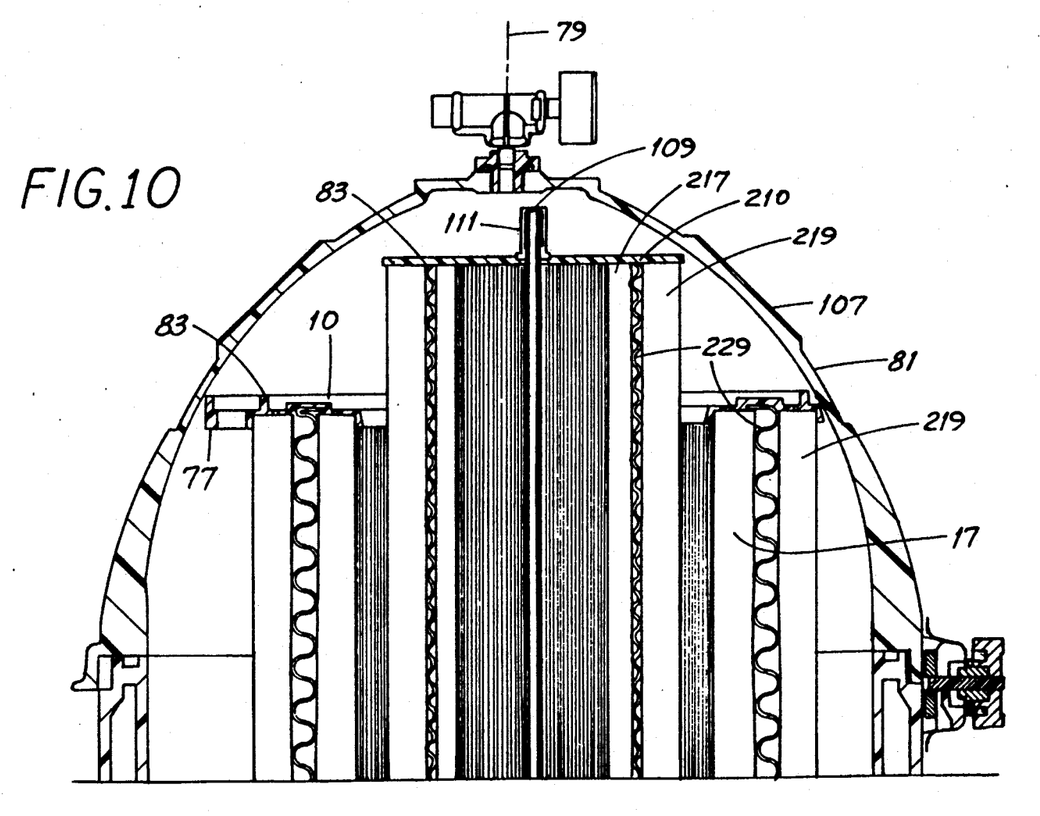
FIG. 10, taken together with FIG. 9, is a cross-sectional view of a second embodiment of a quasi-spherical filter cartridge housing with one improved filter cartridge and one conventional cartridge contained therein.

In the arrangement shown in FIGS. 9 and 10, the outer cartridge 10-O includes a channel and discharge port while the inner cartridge 210 is of a conventional type wherein its end cap 215 is seated in a pocket 225. This arrangement is more likely to be used when such inner cartridge 210 is relatively small. And if the arrangement includes three or more cartridges 10 or 210, more than one but less than all cartridges 10, 210 could have a channel 41 and discharge port 43, depending upon the particular cartridge-housing arrangement.

Referring now to FIGS. 3 and 8; and 10 and irrespective of the number of cartridges 10, 210 within the housing 27, it is also preferred that the upper and lower ends 83, 85 respectively, of each cartridge 10, 210 be non-aligned (i.e., be spaced vertically) from the upper end(s) and lower end(s), 83, 85 respectively, of other cartridges 10, 210. When so arranged, the "envelope" defined by the plural nested cartridges 10, 210 is quasi-spherical in shape for improved interior space utilization.

Filter elements 17, 19 used in filter cartridges 10 are often made of pleated paper or cloth. While such elements 17, 19 do an excellent job of removing particulate matter from the fluid, they are readily damaged. And for best filter efficiency, it is preferred that fluid pass through such elements 17, 19 across the entirety of the element area rather than merely at a concentrated locale. Accordingly, a preferred housing 27 includes a disc-like baffle 87 for deflecting inflow, i.e., fluid flowing into such housing 27.

The baffle 87 prevents such pressurized fluid—which often enters the housing 27 through an inlet port 91 normal to and closely adjacent a filter element 19—from directly impinging on such element 19, thereby preventing damage to such element 19. Grooves 89 direct fluid against the baffle 87 which thereupon direct such fluid along paths parallel to the outer surface of the filter element 19 so that fluid enters the element 19 substantially across the entirety of its area. The arrows adjacent the baffle 87 in FIG. 3 illustrate how fluid striking the baffle 87 is directed along such paths. It is to be understood that only fluid flow upward and downward is illustrated by the arrows. In practice, fluid flows radially outward 360° from the baffle longitudinal center line 93.

Near its bottom portion, the housing 27 also includes a collector 95 to which the cartridges 10 are connected as described in greater detail below. Such collector 95 has an outlet chamber 97 through Which all filtered fluid passes on its way to the outlet port 51.

Referring particularly to FIG. 9, the housing 27 is (or should be) drained and cleaned when filter cartridges 10, 210 are cleaned or replaced and when the equipment is being stored for winter. Accordingly, one preferred housing 27 also includes a valve 99 for draining fluid from such housing 27. The valve 99 has an interior head 101 which seals against the collector 95 when the valve 99 is closed as shown. When the valve 99 is opened, the head 101 separates from the collector 95 and fluid in the chamber 97 flows through the resulting opening and drains. The valve 99 also includes an optional coupler 103 for attaching a garden hose since the user may wish to drain fluid to a remote site.

For most effective filtration, the cartridge(s) 10, 210 are retained in a "seated" position in the housing 27 to prevent fluid leakage around the cartridge(s) 10, 210. In preferred embodiments, the size(s) and shape(s) of the cartridge(s) 10, 210 and housing 27 are selected such that the upper, outer perimeter of each cartridge 10, 210 is in contact with (or is at least closely adjacent) the wall 81 of the housing 27 when the housing cover 107 is in place. Such arrangement substantially prevents the cartridge(s) 10, 210 from moving during operation. It is to be noted that the vertical longitudinal center lines 105 of both cartridges 10, 210 are coincident but are offset laterally from the vertical axis 79 of the housing 27. This provides slight extra space on the left side of the cartridges 10, 210 to accommodate the baffle 87 and the handle 75.

On startup (when the housing 27 is first being filled with fluid), entrapment of air in the housing 27 is to be avoided. To that end, an air vent tube 109 with a screen-like cap 111 is provided to permit rising fluid to expel air from the housing 27 through the outlet port 51.

The foregoing briefly describes an improved filter cartridge 10 and how plural cartridges 10, 210 (perhaps only one or less than all of which include a channel 41 and discharge port 43) are used in a quasi-spherical housing 27. However, the improved cartridge 10 is not so limited in its use. More specifically, the improved cartridge 10 may be used in housings 27 of other configurations and in a way to maximize the amount of interior housing space used for filtration.

Figure 11:
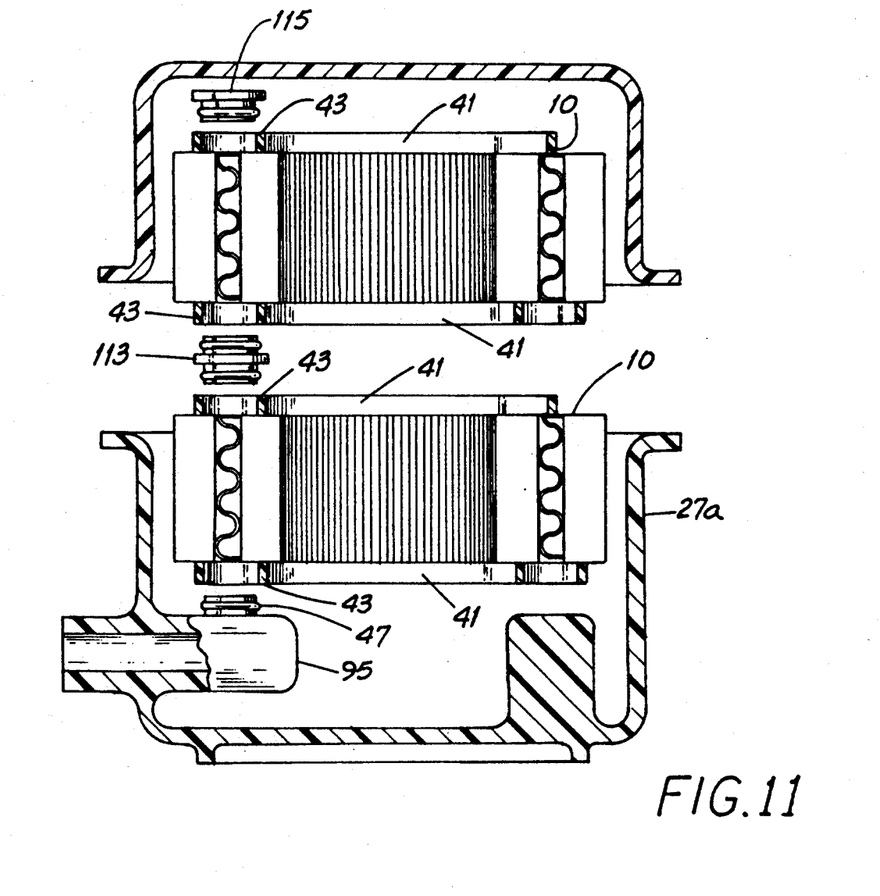
FIG. 11 is a simplified cross-sectional elevation view of a cylindrical tank having two improved filter cartridges contained therein in stacked relationship.

Referring to FIG. 11 and as an example, the improved filter cartridge 10 may be used either singly or, as illustrated, in a plural stacked cartridge arrangement in a cylindrical housing 27a. In the latter, two or more improved cartridges 10 may be used. The lower cartridge 10 includes a channel 41 and discharge port 43 integral thereto. That port 43 at the lower end is attached to the outlet vent 47 of the collector 95 while that at the upper end is attached to the port 43 of the upper cartridge 10 by a nipple 113.

Such upper cartridge 10 also includes an integral channel 41 and port 43, the latter for attachment to the lower cartridge 10. For arrangements involving three or more stacked cartridges 10, each such cartridge 10 except the uppermost has a port 43 at either end. In the interest of uniformity of production, all such cartridges 10 may have a port 43 at either end and the upper channel 41 of the uppermost cartridge 10 is closed by a plug 115. In the stacked cartridge arrangement described above, all cartridges 10 are generally cylindrical in shape and preferably have the same outside diameter.

The foregoing description sets forth the manner in which the improved cartridge 10 responds to and fulfills a long-felt need for a cartridge which (a) provides a substantially leak-proof sealed connection to help assure filtration of all fluid and (b) is readily removable, even in larger sizes, for cleaning or replacement.

An example will provide a further appreciation of the benefits of the invention. One exemplary cylindrical filter cartridge 10 has a total filtration area of about 260 square feet, an outer diameter of about 20 inches, an inner diameter of about 13 inches, a height of about 2 inches and a dry weight of about 13 pounds.

If constructed conventionally, the circumference of the outer perimeter 223 of the end cap 215 is about 64 inches while that of the inner perimeter 221 of such cap 215 is about 43 inches. Therefore, the total "perimeter of engagement" of the end cap 215 with a pocket 225 is in excess of 100 inches. Such perimeter results in significant friction which must be overcome as the cartridge 210 is inserted into or removed from its housing 27. In contrast, a cartridge 10 made in accordance with the invention has a perimeter of engagement of the port 43 of about 7-8 inches. While the resulting friction may not be reduced in precise proportion to the reduction in the perimeter of engagement, it is apparent that such friction will be very substantially reduced.

It is to be appreciated that the foregoing examples and embodiments are by way of explanation rather than limitation. Although not expressly depicted or described, other examples may nevertheless be within the scope of the invention.

We claim:

1. In a fluid filter cartridge of the type having spaced filter elements supported by first and second end caps, the elements defining an effluent path therebetween, at least the first end cap having an interior element-supporting surface, an exterior surface and a plurality of annularly-arranged exit passages communicating with the path, the improvement comprising:
    an annular fluid exhaust manifold coupled to the exterior surface of the first end cap and defining a ring-like conduit in communication with the exit passages; and,
    a discharge port coupled to the conduit and configurated and arranged for low-friction detachment from an outlet vent.

2. The invention of claim 1 wherein such manifold further includes a rib for supporting the cartridge within a filter housing.

3. The invention of claim 1 wherein the filter elements are separated by a core and the manifold has a divider supporting the core.

4. The invention of claim 1 wherein the first end cap includes a pair of spaced rims extending away from the first end cap and a closure member joining the rims, thereby forming the manifold.

5. The invention of claim 4 wherein the rims are formed integral to the first end cap and the closure member is attached to the rims, thereby forming the manifold.

6. The invention of claim 1 wherein the cartridge includes a tube-like riser in fluid communication between the path and the discharge port whereby the cartridge is self-venting.

7. The invention of claim 2 wherein one of the end caps includes an outward-extending lip defining a lifting handle, thereby aiding the removal of the cartridge from a filter housing.

8. The invention of claim 1 wherein the cartridge is a first cartridge, has a first height and is within a quasi-spherical housing containing a second cartridge around the first cartridge and having a second height less than the first height thereby increasing utilization of the space within such housing.

9. The invention of claim 8 wherein such cartridges are generally cylindrical and generally concentric to one another.

10. The invention of claim 1 wherein the elements have generally cylindrical sides, the cartridge is within a housing having an inlet port and an inlet baffle aligned with the inlet port for deflecting fluid along paths generally parallel to the sides of the elements.

11. The invention of claim 10 wherein such housing further includes a valve for draining fluid from such housing and a coupler for attaching a hose thereto.

12. The invention of claim 1 wherein the cartridge is a first cartridge and is within a housing containing a second cartridge having a fluid exhaust manifold and a discharge port integral thereto and wherein such first and second cartridges are in stacked relationship with interconnected manifolds.

13. The invention of claim 12 wherein such first and second cartridges are generally cylindrical and have substantially the same outside diameter.

14. In a fluid filter cartridge of the type having spaced filter elements separated by a core, the elements defining an effluent path therebetween, the improvement comprising:

a fluid exhaust manifold integral to the cartridge and including a divider supporting the core, the manifold further including a discharge port in fluid communication with the path and configured and arranged for low-friction detachment from an outlet vent.

* * * * *